United States Patent

Mandal et al.

Patent Number: 5,862,450
Date of Patent: Jan. 19, 1999

[54] METHOD AND APPARATUS FOR DELIVERING SIMULTANEOUS CONSTANT BIT RATE COMPRESSED VIDEO STREAMS AT ARBITRARY BIT RATES WITH CONSTRAINED DRIFT AND JITTER

[75] Inventors: Kallol Mandal, Fremont; Steven Kleiman, Los Altos, both of Calif.

[73] Assignee: Sun Microsytems, Inc., Mountain View, Calif.

[21] Appl. No.: 572,639

[22] Filed: Dec. 14, 1995

[51] Int. Cl.$^6$ .............................. H04H 1/00; H04N 7/10
[52] U.S. Cl. .................................. 455/3.1; 348/6
[58] Field of Search .................... 395/200.47–200.49; 348/6, 7, 12, 13, 10, 11; 455/3.1, 4.1, 4.2, 5.1, 6.1, 6.2; H04N 7/10, 7/14, 7/173

[56] References Cited

U.S. PATENT DOCUMENTS

| | | | |
|---|---|---|---|
| 5,446,735 | 8/1995 | Tobagi et al. | 370/85.3 |
| 5,517,488 | 5/1996 | Miyazaki et al. | 370/16 |
| 5,533,021 | 7/1996 | Branstad et al. | 370/60.1 |
| 5,535,209 | 7/1996 | Glaser et al. | 370/84 |
| 5,652,749 | 7/1997 | Davenport et al. | 370/466 |
| 5,699,362 | 12/1997 | Makam | 370/437 |

FOREIGN PATENT DOCUMENTS

| | | | |
|---|---|---|---|
| 0 661 855 | 5/1995 | European Pat. Off. | H04L 29/06 |
| 04 167 841 | 6/1992 | Japan | H04L 12/40 |
| 06 006 362 | 1/1994 | Japan | H04L 12/40 |
| 06 097 940 | 4/1997 | Japan | H04L 12/28 |

*Primary Examiner*—Mark R. Powell
*Assistant Examiner*—John W. Miller
*Attorney, Agent, or Firm*—Steven F. Caserza; Flehr Hohbach Test Albritton & Herbert

[57] ABSTRACT

A video server is taught which is capable of outputting a plurality of video streams simultaneously. Each video stream is synchronized at two levels of synchronization: coarse-grain and fine-grain. The coarse-grain synchronization is carried out in software over a plurality of packets of data, and the fine-grain synchronization carried out using the network clock. By utilizing both coarse-grain and fine-grain synchronization as taught by this invention, drift and jitter are controlled, providing accurate presentation of constant bit rate data to a receiving device. As another feature of this invention, a bit pump is utilized which includes header information such as constant bit rate information, and information regarding the rates associated with the coarse-grain and fine-grain synchronization. By utilizing this preinitialized header information, CPU demands are reduced as compared with prior art systems in which the CPU must look up timing information from the data to be transmitted.

14 Claims, 2 Drawing Sheets

METHOD AND APPARATUS FOR DELIVERING SIMULTANEOUS CONSTANT BIT RATE COMPRESSED VIDEO STREAMS AT ARBITRARY BIT RATES WITH CONSTRAINED DRIFT AND JITTER

FIELD OF THE INVENTION

The present invention relates generally to video delivery systems used with video servers, and more specifically to methods and apparatus for scheduling constant bit rate video data transmission with constrained jitter and drift.

BACKGROUND OF THE INVENTION

Video servers, including networked video servers, are known in the art. At the transmitting end, video servers include a library of multimedia (e.g. video and audio) sources, which typically consists of movies or other entertainment, often referred to as "titles". The video and audio that make up a title are stored as "bit streams" or simply referred to as "streams" on the video server. Video servers permit one or more users to select one or more of the movies for viewing. An admission arbitrator unit is provided to limit the number of users allowed to use the video server at any given time, to prevent overloading the network or disk storage subsystem. Such overload could cause movies to run too slowly or to move forward (or backward) in a jerky manner.

The video server includes magnetic storage hard disk drives on which recorded blocks from the video titles are magnetically stored. Titles might be any length, from a 30-second commercial to a two hour feature movie. For VHS-quality video streams, the delivery rate is typically 1.5 to 2 Mbit/second for MPEG-1 encoding; 4 Mbit/second for MPEG-2 encoding. Full resolution (CCR-601) video is typically recorded at a higher rate (4 to 8 Mbit/second); HDTV Grand Alliance systems allow rates of 10 to 45 Mbit/second. Thus, one MPEG-1 or MPEG-2 movie may require 1 GB to 8 GB of storage media, with a typical two-hour, VHS-quality movie consuming about 1.8 GB of disk space.

To sustain the throughput that is required for the timely delivery of video streams, you cannot store the bit stream for a single movie in a single hard disk unit, because a typical single hard disk drive can only output data at the rate of a few MBytes/second. To circumvent this bottleneck, it is common to store blocks of the movie (e.g., perhaps 0.5 second sequences) in multiple hard disk units. These blocks are then read out to a buffer, and communicated over the network. As these blocks are sent over the network, new blocks from the movie are read out from a set of hard disk units, hereinafter referred to as a disk array. At the receiving end, the blocks are decoded for user viewing on a video monitor, television receiver or the like.

The server delivers bit streams from the array of disks at a constant bit rate. The video server must assure that once a stream request is accepted, the stream is delivered at the specified constant bit rate until the stream ends or the server is told to stop.

Delivered video streams are independent in that they can each be stopped and started independently. Furthermore, these delivered bit streams may each contain different content (i.e. each being a different movie) or a plurality of delivered streams can be from the same content stream, such as a plurality of video streams containing video data from the same movie. Furthermore, the video streams from the same content need not be synchronized so that more than one viewer can be watching the same movie simultaneously, although one user started the movie at a different time from the other.

There are two general models used for video server systems. One is a so-called "pull" model, in which receiving devices request information from the video server, which then responds to these requests. In such "pull" type systems, there are inherently present controls to ensure that data is received on time and in a proper sequence even in the event of bit errors, since the receiving system is in essence in control of the video server and can re-request information or hold a request until a previous request has been properly received.

The other model for video servers is the "push" model, in which the video server receives an initial instruction to start a video stream, and thenceforth the video server "pushes" the video stream out at a constant bit rate with no dynamic flow control or error recovery protocol. In this "push" model of stream delivery, the server delivers video streams from the array of disks at a constant bit rate. The video server's requesting client can assume that once a stream request is accepted, the stream is delivered at the specified constant bit rate until the stream ends or the server is told to stop.

Video data, such as MPEG-1 and MPEG-2 encoded data, has time-critical properties that impose special requirements for real-time delivery of the data over a digital network from a server to one or more clients that decode the data. One reason for this requirement is that the greater expense of resources resides in servers rather than in receiving devices. For this reason, there is very little buffering available on decoders. (The amount of buffering is typically measured in milliseconds.) When a user requests the playing of a title, the server must ensure that almost every bit of the data arrives at the decoder (for example, a set-top box) at the time at which it was intended. Failure to meet such time-constraints can render the data useless.

Persistent or periodic failure to meet these time-critical requirements for video delivery manifests itself as "drift" and "jitter". Drift is a persistent trend in one direction such as when a server is continually late by a few milliseconds over time. Drift can render a title unintelligible. Jitter is a temporary overrunning or underrunning of an output device that might manifest itself, for example, in choppy movement in the display of a title. Drift and jitter must be constrained within guaranteed limits to ensure proper delivery of multimedia streams.

Information pertaining to the structure of MPEG data streams and the specific timing requirements are known and are provided, for example, in ISO draft international standard ISO/IEC DIS 13818-1, NXD, International organization for Standardization, 1994. In MPEG-1 and MPEG-2 video streams, the time constraints of a video stream are identified by a time stamp header contained in the encoded bit stream. This time stamp header is known as a Program TimeStamp (PTS) and is calculated with respect to a reference timebase known as the Program Clock Reference (PCR) or System Clock Reference (SCR). The time differences between any two continuous PCR time stamps must exactly reflect the time required to play out the number of bytes between the start of the two PCRs at the bit rate specified in the bit stream.

In the prior art, video data delivery at a constant bit rate is achieved by scheduling the video data delivery based on the underlying network clock, which provides timing for the bits transmitted on the network. Such an approach has the limitation that the delivered data rate is constrained to the granularities supported by network clock, and may make impossible the delivery of simultaneous video streams at arbitrary bit rates. Furthermore, the server design becomes dependent on the characteristics of the particular network output device and requires modification for each type of output device over which it must send data.

Compressed, motion video data files contain information in the form of a continuous stream of time-critical data. This stream contains pieces of system information (SI) at various positions within the video stream that define the time-critical property of the video stream. For example, for digital video that has been encoded using a MPEG-2 Transport Stream compression encoder, the SI information is reflected in the Program Clock Reference (PCR) in the system header. Typically, when these video data streams are stored on disk in a video server, the server uses the SI information that is embedded in the video data stream to schedule the transmission of the data at the appropriate time. The "at various positions" method of looking up the SI information for scheduling video data delivery typically results in a high CPU utilization on the server when there are a large number of video streams being transmitted simultaneously, thereby limiting severely the maximum performance of the server (in terms of number of simultaneous video streams that can be transmitted).

SUMMARY OF THE INVENTION

In accordance with the teachings of this invention, a video server is taught which is capable of outputting a plurality of video streams simultaneously. Each video stream is synchronized at two levels of synchronization: coarse-grain and fine-grain. The coarse-grain synchronization is carried out in software over a plurality of packets of data, and the fine-grain synchronization carried out using the network clock. By utilizing both coarse-grain and fine-grain synchronization as taught by this invention, drift and jitter are controlled, providing accurate presentation of constant bit rate data to a receiving device.

As another feature of this invention, a bit pump is utilized which includes header information such as constant bit rate information, and information regarding the rates associated with the coarse-grain and fine-grain synchronization. By utilizing this preinitialized header information, CPU demands are reduced as compared with prior art systems in which the CPU must look up timing information from the data to be transmitted.

DETAILED DESCRIPTION OF EXEMPLARY EMBODIMENTS

Figure 1:
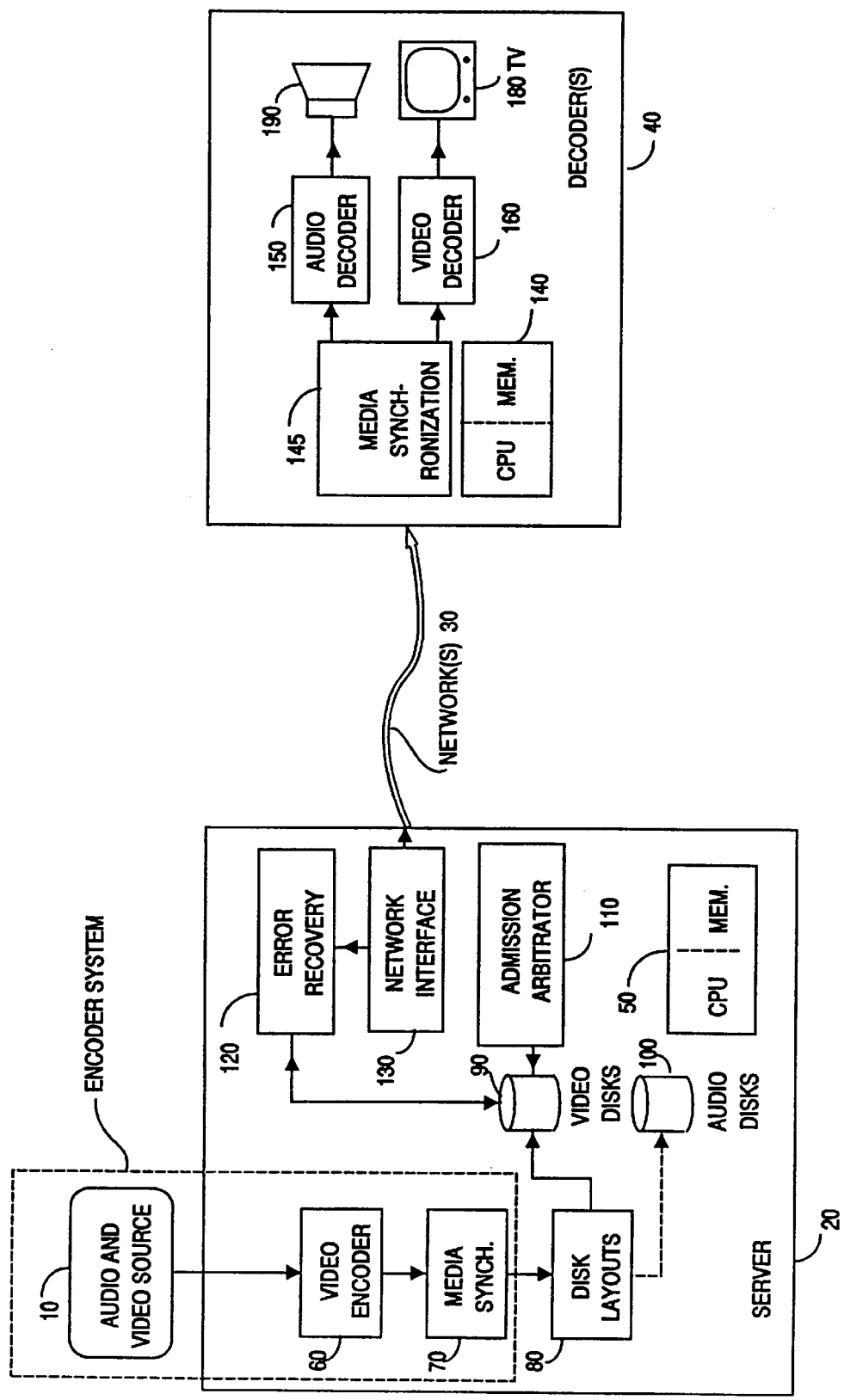
FIG. 1 depicts a network for distributing video which is suitable for video on demand client-server applications.

FIG. 1 depicts a video delivery system in which video is arranged for storage and distributed according to the present invention. Audio and video information source 10 is part of an encoding system which also includes video encoder 60 and media synchronizer 70 for synchronizing audio, video and text information. This encoding system provides processed output which is coupled over one or more networks 30 to one or more target clients or decoder systems 40. The network may be homogeneous with network transmission occurring through a so-called network cloud that carries a multicast of the encoded information stream, or transmission may be point-to-point. If heterogeneous, the networks can have widely varying bandwidth characteristics, ranging from as low as perhaps 64 Kbps for telephones, to 155 Mbps or more for ATM networks.

Server 20 includes central processor unit ("CPU") with associated memory, collectively 50. Server 20 further includes disk layout system 80 for arranging the information processed by encoder 60 onto video storage disk unit 90 (or other storage media). Storage 100 is also provided for signal processed audio information. The present invention may also be practiced in systems wherein video and audio information are stored in a common storage disk unit 90, using interleaving techniques, for example. In such systems, the separate storage unit 100 depicted in FIG. 1 is omitted.

Admission control mechanism 110 and communication error recovery mechanism 120 for handling bit errors or packet cell loss are also coupled to processed video storage 90. The server communicates with the heterogeneous network(s) through network interface 130, which interfaces with one or more network(s) 30 coupled to decoder system(s) 40, with each one of network 30 being coupled to one or more decoders 40.

At the receiving end, decoder system(s) 40 each include central processing unit ("CPU") 140 that includes a CPU per se and associated memory that may include cache memory. Decoder(s) 40 further includes a mechanism 145 for synchronizing audio and video information from the incoming embedded stream, as well as audio and video decoders 150, 160. The output from these decoders is coupled to sound generators, e.g., speakers 190, and to video displays, depicted as TV 180.

The system shown in FIG. 1 may be used in many applications. For example, a hotel may provide video on demand to a plurality of hotel rooms for guest viewing, or a cable company may provide video on demand to a plurality of subscribers.

If desired, the present invention 80 may be practiced with an end-to-end scalable video system that uses a scalable video encoder. Such a video encoder is disclosed in U.S. patent application Ser. No. 08/423,812 filed Apr. 18, 1995, entitled SOFTWARE-BASED ENCODER FOR A SOFTWARE-IMPLEMENTED END-TO-END SCALABLE VIDEO DELIVERY SYSTEM, and assigned to the assignee herein. A video decoder for decoding a scalably encoded video stream is disclosed in U.S. patent application Ser. No. 08/424,703, filed Apr. 18, 1995, entitled DECODER FOR A SOFTWARE-IMPLEMENTED END-TO-END SCALABLE VIDEO DELIVERY SYSTEM, and assigned to the assignee herein. Of course, the present invention may also be practiced with more conventional video display systems. If desired, the present invention may also employ a video disk system 90 and error recovery system 120 as disclosed in U.S. patent application Ser. No. 08/446,144, filed May 22, 1995, entitled SERVER DISK ERROR RECOVERY SYSTEM, and assigned to the assignee herein.

In accordance with one aspect of the present invention, novel timing and control is provided in order to achieve synchronization which minimizes drift and jitter, thereby assuring valid timing and usable data between the video server and a display device.

Figure 2:
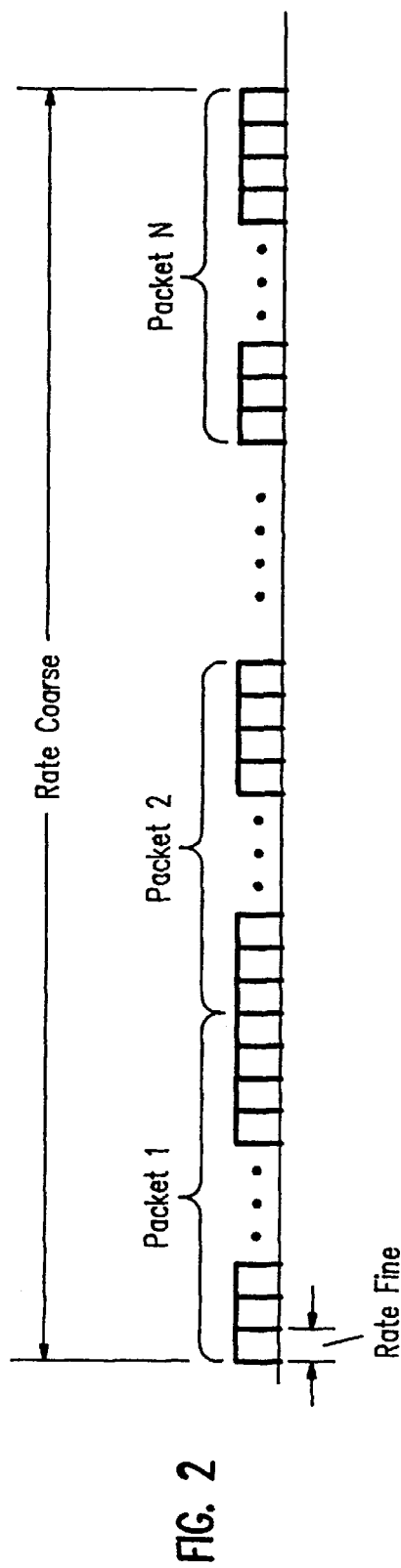
FIG. 2 depicts the server scheduling mechanism for constant bit rate video for transmission into networks, in accordance with one embodiment of the present invention.

In accordance with the teachings of this invention, for each video stream being transmitted over one of network(s) 30, the delivered bit streams forming multimedia data from server 20 is synchronized at two levels of synchronization: coarse-grain and fine-grain. The coarse-grain synchronization is maintained in software over a large chunk of data (DataChunk) by a software module known as the bit pump, and described in more detail below. The coarse-grain synchronization is made to correspond to the exact bit rate (RateCoarse) of the bit stream, based upon the length of a group of packets, as depicted in FIG. 2. The fine-grain synchronization is carried out using the network clock itself, i.e. corresponding to the bit rate of the network 30 as established by network interface 130 for that network depending on that network's bandwidth.

The granularity of the network delivery rate is selected to correspond to a rate of transmission (RateFine) that is slightly higher than that for the coarse-grain synchronization, i.e. RateFine is set by rounding up to the closest granularity matching the encoded bit rate. For example, if network 30 is an ATM network having a bandwidth granularity of 64 Kbs and it is desired to have a data rate of 1.5 Mbs constant bit rate, RateCoarse is set per equation 1 as follows:

$$\frac{1}{\text{RateCoarse}} = \Delta T = \frac{\text{buffer size}}{\text{constant bit rate}} \quad (1)$$

Thus, for a buffer size of 8K, $$\frac{1}{\text{RateCoarse}} = \Delta T = \frac{8K \text{ bits}}{1.5 \text{ Mbps}} = 5{,}333 \, \mu\text{sec} \quad (2)$$

In this example, RateFine is established as $$\Delta T_{fine} = \frac{1}{\text{RateFine}} = \frac{8K \text{ bits}}{64 Kbps \cdot x} \quad (3)$$

where X is selected such that

64 Kbps·x ≧ 1.5 Mbps therefore, in this example x=24

$$\Delta T_{fine} = \frac{1}{\text{RateFine}} = \frac{8K \text{bits}}{64 Kbps \cdot 24} = 5208.3 \, \mu\text{sec} \quad (4)$$

In accordance with the teachings of this invention, the long term bit rate is synchronized to the software bit pump. The jitter in the approach described above is constrained by:

Max Jitter=(DataChunk)*((1/RateCoarse)−(1/RateFine)), where RateFine>RateCoarse.

The maximum jitter can be controlled by appropriate selection of the RateFine parameter by using the interfaces provided by the network adapter card. If there are no interfaces, the network default bit rate is used. The drift is constrained by the accuracy of the software clock in the bit pump. Since this clock is based on the host computer, the drift is limited to the accuracy of the clock on the host computer, which provides sufficiently low drift for it to be of acceptable quality.

Figure 3:
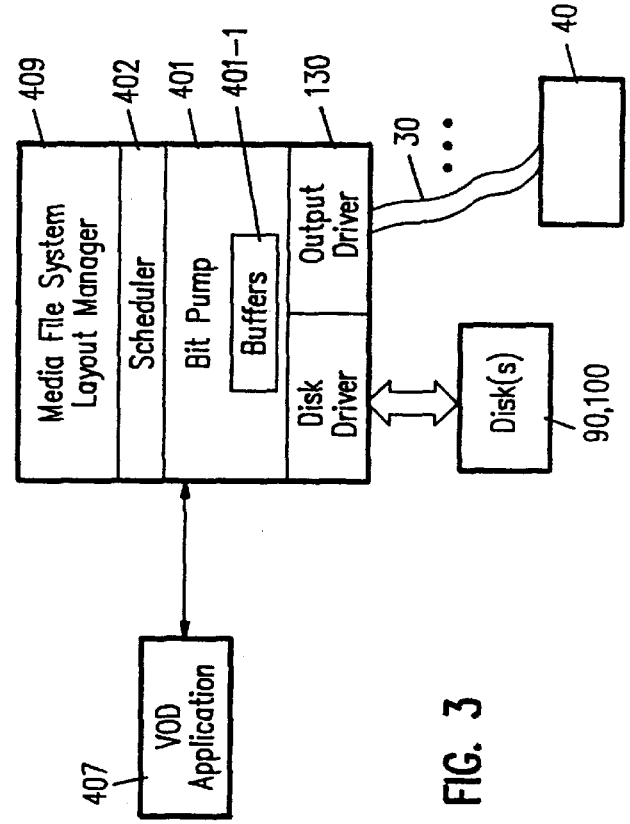
FIG. 3 is a diagram depicting a video on demand server constructed in accordance with one embodiment of this invention.

FIG. 3 shows one embodiment of a structure including bit pump 401, in accordance with this feature of the present invention. Bit pump 401 acts to set up an optimized data path between disks 90, 100 and network 30. Once the path is set, the data flows directly from disks 90, 100 to network 30 via system memory 50-2 (FIG. 1). The data is transmitted on network 30 with the characteristics (including rate control for constant bit rate) that are established during the creation of the data path.

Data pump 401 provides data buffers 401-1 for each stream of data, with buffers 401-1 being used by Video on Demand (VOD) application 407 to schedule the disk reads. Data buffers 401-1 are also initialized with selected network parameters that are used by bit pump 401 to implement the schedule of data transmission of each stream over the ATM network 30 or other output device.

VOD application 407 has the responsibility of ensuring that the disk read schedule is carried out in a fashion that meets the deadlines of the network data transmission. In the constant bit rate (CBR) case, data buffers 401-1 are drained by bit pump 401 at the specified rate using network packets of the specified size. The rate synchronization of the data transmission is carried out in two levels of granularity: coarse-grain and fine-grain (as shown in FIG. 2).

The coarse-grain synchronization is carried out over a bigger chunk of data such as a plurality of packets (and hence termed "coarse") by the bit pump module using the operating system software timer of coarse resolution.

The fine-grain synchronization is carried out by the network hardware (e.g., output driver 130, such as an ATM interface). The rate synchronization here is at the underlying network data unit level (e.g., for ATM: the ATM cell level), i.e. cells are scheduled for DMA from host memory to the buffers on the ATM interface card, and subsequently transmitted to the network at an interarrival time derived from the bit stream's constant bit rate.

The coarse-grain bit rate is set to a value that corresponds to the exact desired constant bit rate. In addition, in order to prevent queue overflows along the network transmission path, the coarse-grain rate is set to a value that is slightly lower than the finer synchronization of the ATM hardware cell rate. As a result, the long term rate synchronization is based on the operating system timer rather than the network hardware clock.

The minute disparity in the two levels of synchronization results in a jitter that is directly proportional to the rate mismatch of the two levels. This jitter occurs periodically at each delivery of the data chunk buffer 401-1 (FIG. 3) to the network. Note that this is the worse case jitter, i.e. the jitter is constrained by this amount $$R_{BitPump} < R_{Network} \quad (5)$$

Bit pump 401 is responsible for allocating internal buffering and efficiently transferring data between the disk and the output drivers using the internal buffers. It is responsible for coarse-grain and fine-grain scheduling and rate control of the output driver. Bit pump 401 is somewhat dependent on the particular output driver used in that the network clock will vary among different types of network interfaces.

Bit pump 401 includes header information and information pointing to specified address locations within buffers 401-1. The headers are initialized for a given video stream, based upon the network to which that stream is to be directed, with information defining the nature of the data transmission over that network. For example, header information includes constant bit rate information, RateFine information, and RateCoarse information.

In accordance with the teachings of this invention, since this header information is preinitialized, data pump 401 is able to use that header information quickly, and does not need to parse the data packet itself in order to extract or derive this information. This provides a significant advantage over the prior art in that prior art video servers are required to parse the data packet in order to obtain information required to maintain the constant bit rate. In one embodiment of this invention, bit pump 401 is a kernel level program, providing a kernel level interface to an application program, such as a Media Stream Manager, such as Scheduler 402. Bit pump 401 includes format information defining the format of the header, allowing the application program to provide the information to complete the header.

In accordance with this feature of the present invention, transmission of video data streams from disk is achieved without looking up the SI information in the video data stream, thereby reducing the CPU overhead and thereby allowing a large number of concurrent video streams to be handled simultaneously. When a video stream has been encoded using a constant bit rate encoder, the bit-distance between two arbitrary positions (i.e. the difference in number of bytes between two positions) of the video stream is proportional to the time distance between these two positions (i.e. the distance in terms of the time when the data at these positions are to be presented for display) in accordance with $$T_2 = T_1 + \frac{\text{distance (in bytes) between } B_{N+1} \text{ and } B_N}{\text{RateCoarse}} \qquad (6)$$

As a result, this invention provides that the server schedules the video data for transmission at the appropriate times based only on the constant bit rate of the encoded video data stream and without looking at the SI information internal to the video data stream itself. This is a significant improvement over the prior art, which solves this problem by looking up the SI(2) and SI(1) information near byte positions B2 and B1, respectively, and then transmits the video data between B2 and B1 over a period of time given by SI(2)–SI(1).

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit or scope of the appended claims.

What is claimed is:

1. A video server system comprising:
    a video server for outputting a plurality of bit streams of constant bit rate data;
    one or more destination systems, each for receiving one of said constant bit rate data streams;
    a network interface coupled to said server and associated with one of said destination systems;
    a network connection between said network interface and said destination system; and
    synchronization control providing coarse-grain synchronization of said constant bit rate data based upon a time period derived by a plurality of packets of said constant bit rate data and fine-grain synchronization based upon the bit rate of said bit stream.

2. A structure as in claim 1 wherein said fine-grain synchronization is selected to be slightly higher than said coarse-grain synchronization.

3. A structure as in claim 2 wherein said fine-grain synchronization is established utilizing a fine rate of synchronization set by rounding up to the closest granularity matching the encoded bit rate.

4. A structure as in claim 1 wherein said coarse-grain synchronization is achieved by establishing a bit rate equal to the desired constant bit rate.

5. A video server system comprising:
    a video server for outputting a plurality of bit streams of constant bit rate data;
    one or more destination systems, each for receiving one of said constant bit rate data streams;
    a network interface coupled to said server and associated with one of said destination systems;
    a network connection between said network interface and said destination system; and
    a bit pump containing a plurality of entries, each entry including a pointer to a specified location in memory and header information defining the nature of the data transmission over the network.

6. A structure as in claim 5 wherein said header information comprises constant bit rate information and synchronization information.

7. A structure as in claim 5 wherein said header information is used to affect data transmission over the network to the exclusion of network transmission information derived from the data to be transmitted.

8. A method for operating a video server system comprising the steps of:
    coupling a network interface to a video server and, via a network connection, one of a plurality of destination systems;
    outputting from said server a bit stream of constant bit rate data;
    providing coarse-grain synchronization of said constant bit rate data based upon a time period derived by a plurality of packets of said constant bit rate data; and
    providing fine-grain synchronization based upon the bit rate of said bit stream.

9. A method as in claim 8 wherein said step of providing fine-grain synchronization provides a rate of synchronization slightly higher than said coarse-grain synchronization.

10. A method as in claim 9 wherein said step of providing fine-grain synchronization utilizes a fine rate of synchronization set by rounding up to the closest granularity matching the encoded bit rate.

11. A method as in claim 8 wherein said step of providing coarse-grain synchronization is achieved by establishing a bit rate equal to the desired constant bit rate.

12. A method for operating a video server system comprising the steps of:
    coupling a network interface to a video server and, via a network connection, one of a plurality of destination systems; and
    outputting from said server a bit stream of constant bit rate data; utilizing a bit pump responsive to a plurality of entries, each entry including a pointer to a specified location in memory and header information defining the nature of the data transmission over the network.

13. A method as in claim 12 wherein said header information comprises constant bit rate information and synchronization information.

14. A method as in claim 12 wherein said header information is used to affect data transmission over the network to the exclusion of network transmission information derived from the data to be transmitted.

* * * * *